US010613611B2

(12) United States Patent
Gendler et al.

(10) Patent No.: US 10,613,611 B2
(45) Date of Patent: Apr. 7, 2020

(54) CURRENT CONTROL FOR A MULTICORE PROCESSOR

(71) Applicant: Intel Corporation, Santa Clara, CA (US)

(72) Inventors: Alexander Gendler, Kiriat Motzkin (IL); Efraim Rotem, Haifa (IL); Nir Rosenzweig, Givat Ella (IL); Krishnakanth V. Sistla, Beaverton, OR (US); Ashish V. Choubal, Austin, TX (US); Ankush Varma, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 761 days.

(21) Appl. No.: 15/182,990

(22) Filed: Jun. 15, 2016

(65) Prior Publication Data

US 2017/0364132 A1    Dec. 21, 2017

(51) Int. Cl.
*G06F 1/32*    (2019.01)
*G06F 1/324*   (2019.01)
(Continued)

(52) U.S. Cl.
CPC .............. *G06F 1/324* (2013.01); *G06F 1/26* (2013.01); *G06F 1/3206* (2013.01);
(Continued)

(58) Field of Classification Search
CPC ...... G06F 1/324; G06F 1/3287; G06F 1/3243; G06F 1/26; G06F 1/3296; G06F 1/3206;
(Continued)

(56) References Cited

U.S. PATENT DOCUMENTS

| 2001/0003207 A1* | 6/2001 | Kling | G06F 1/206 713/320 |
| 2005/0050373 A1* | 3/2005 | Orenstien | G06F 1/206 713/320 |

(Continued)

FOREIGN PATENT DOCUMENTS

WO    WO2015-013080 A1    1/2015

OTHER PUBLICATIONS

International Search Report and Written Opinion dated Aug. 16, 2017 for International Application No. PCT/US2017/032718, 15 pages.

*Primary Examiner* — Volvick Derose
(74) *Attorney, Agent, or Firm* — Schwabe Williamson & Wyatt, P.C.

(57) ABSTRACT

Apparatuses, methods and storage medium associated with current control for a multicore processor are disclosed herein. In embodiments, a multicore processor may include a plurality of analog current comparators, each analog current comparator to measure current utilization by a corresponding one of the cores of the multicore processor. The multicore processor may include one or more processors, devices, and/or circuitry to cause the cores to individually throttle based on measurements from the corresponding analog current comparators. In some embodiments, a memory device of the multicore processor may store instructions executable to operate a plurality power management agents to determine whether to send throttle requests based on a plurality of histories of the current measurements of the cores, respectively.

24 Claims, 6 Drawing Sheets

(51) Int. Cl.
  *G06F 1/3206* (2019.01)
  *G06F 1/3234* (2019.01)
  *G06F 1/3287* (2019.01)
  *G06F 1/3296* (2019.01)
  *G06F 1/26* (2006.01)
  *G06F 1/3203* (2019.01)

(52) U.S. Cl.
  CPC .......... *G06F 1/3243* (2013.01); *G06F 1/3287* (2013.01); *G06F 1/3296* (2013.01); *G06F 1/3203* (2013.01); *Y02D 10/126* (2018.01); *Y02D 10/152* (2018.01); *Y02D 10/171* (2018.01); *Y02D 10/172* (2018.01)

(58) Field of Classification Search
  CPC .. Y02D 10/172; Y02D 10/171; Y02D 10/152; Y02D 10/126
  USPC .......................................................... 713/322
  See application file for complete search history.

(56) References Cited

U.S. PATENT DOCUMENTS

| | | | |
|---|---|---|---|
| 2006/0069903 A1* | 3/2006 | Fischer | G06F 21/57 713/1 |
| 2008/0168287 A1* | 7/2008 | Berry | G06F 1/266 713/323 |
| 2008/0231352 A1* | 9/2008 | Kurd | H03L 7/107 327/544 |
| 2009/0300329 A1* | 12/2009 | Naffziger | G06F 1/3203 712/205 |
| 2012/0066535 A1 | 3/2012 | Naffziger | |
| 2013/0155073 A1* | 6/2013 | Khodorkovsky | G06F 3/14 345/501 |
| 2014/0052965 A1* | 2/2014 | Sarel | G06F 9/4893 712/214 |
| 2014/0359311 A1* | 12/2014 | Jahagirdar | G06F 1/26 713/300 |
| 2015/0095666 A1* | 4/2015 | Ananthakrishnan | G06F 1/3212 713/300 |
| 2015/0370303 A1* | 12/2015 | Krishnaswamy | G06F 1/324 713/322 |
| 2016/0291670 A1* | 10/2016 | Ishii | G06F 1/3203 |
| 2017/0031418 A1* | 2/2017 | Allen-Ware | G06F 1/3243 |

* cited by examiner

```
If (core_active is set or PCU request reset) than

Load the counter with Saturation_value[8:0] shifter by 9 bit

If(X1 clock toggle) do plus one to the counter if bellow saturation window

If(new throttling starts) subtract the penalty value
```

FIG. 5

CURRENT CONTROL FOR A MULTICORE PROCESSOR

TECHNICAL FIELD

The present disclosure relates to processor efficiency and more specifically relates to current control for a multicore processor.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A multicore processor is a single computing component with two or more independent processing units, called cores. A voltage regulator that is external to a multicore processor, e.g., a motherboard or other external voltage regulator, may be coupled to a power source and may power a multicore processor. The external system may govern maximum current (Icc Max) supplied to the multicore processor to prevent physical damage to components of the system, e.g., a packaging interface associated with the multicore processor that is based on controlled collapse chip connection (C4) bumps.

For instance, the external system, e.g., the external voltage regulator, may enter an "overcurrent" state responsive to monitoring current utilization, which may cause the external voltage regulator to shutoff. To avoid the external system entering the "overcurrent" state, an internal controller of the multicore processor, e.g., a power control unit (PCU), may be configured to constrain frequency and voltage settings for the cores to values selected so that a threshold corresponding to the overcurrent state will not be exceeded even in the case of execution of a worst possible virus.

The PCU is typically configured to constrain voltage and frequency to these settings at all times, which means in normal application operation (i.e. not the worst possible virus), the multicore processor may utilize only a fraction of the threshold of the external system, and accordingly may perform at only a fraction of its performance capability in the normal application operation.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 5 illustrates pseudo code that may be executed by the power management agents of FIG. 2, according to various embodiments.

DETAILED DESCRIPTION

Figure 1:
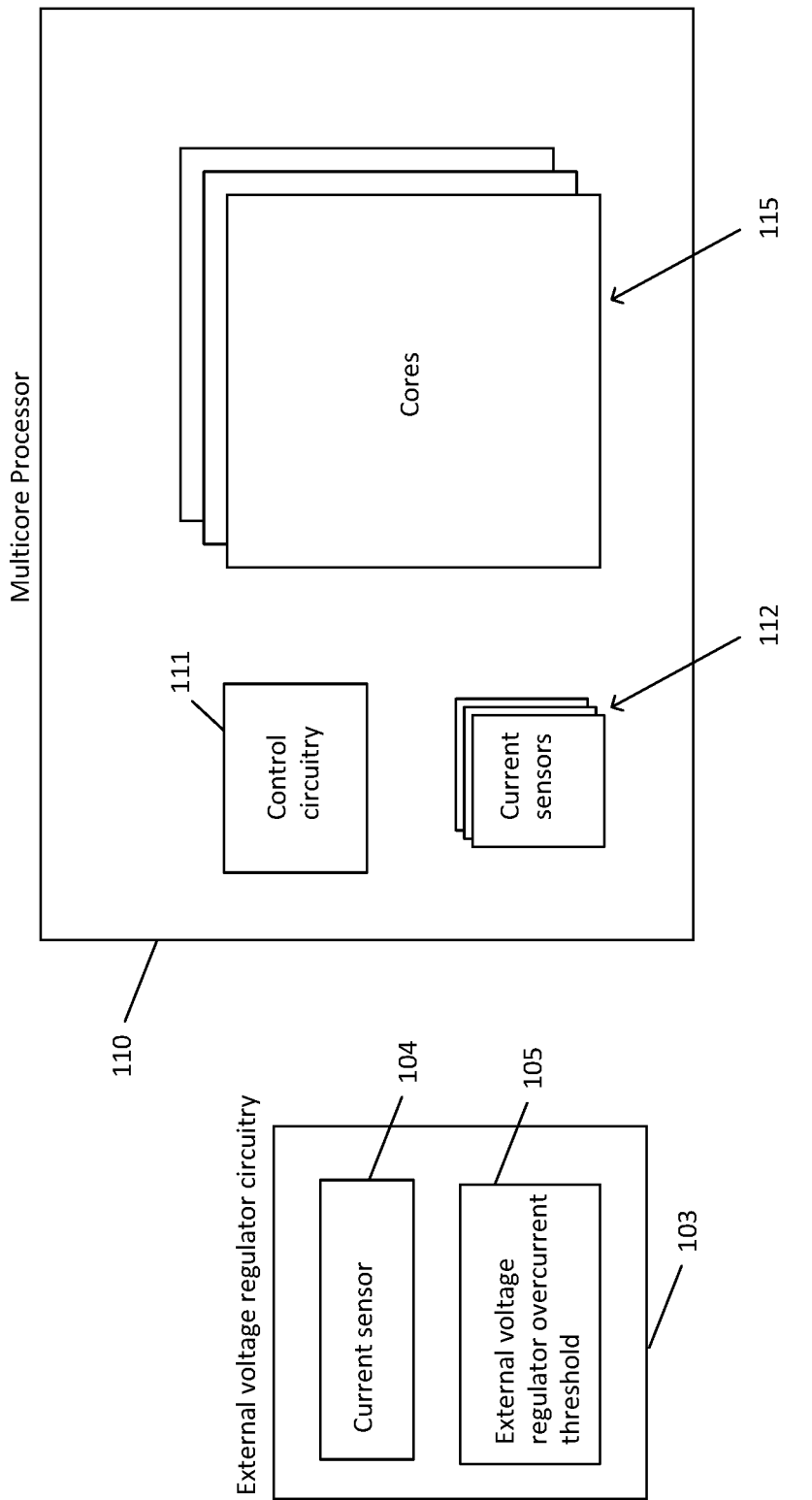
FIG. 1 illustrates an example system equipped with technology for current control for a multicore processor.

Apparatuses, methods and storage medium associated with current control for a multicore processor are disclosed herein. In embodiments, a multicore processor may include a plurality of analog current comparators, each analog current comparator to measure current utilization by a corresponding one of the cores of the multicore processor. The multicore processor may include one or more processors, devices, and/or circuitry to cause the cores to individually throttle based on measurements from the corresponding analog current comparators. In some embodiments, a memory device of the multicore processor may store instructions executable to operate a plurality power management agents to determine whether to send throttle requests based on a plurality of histories of the current measurements of the cores, respectively.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates an example system 100 equipped with technology for current control for a multicore processor 110, e.g. a multicore processor system on chip (SoC). The multicore processor 110 may have a core region with cores 115 and an uncore region including at least control circuitry 111 and current sensors 112, e.g., analog current comparators or other fast current sensors. Each one of the current sensors 112 may measure current utilization by a corresponding one of the cores 115. The control circuitry 111 may cause the cores 115 to individually throttle based on measurements from the current sensors 112, thereby locally controlling current utilization by the cores 115.

In some embodiments, the control circuitry 111 may generate a current measurement history for each one of the cores 115 based on measurements of current utilization by a respective one of the current sensors 112. The control circuitry 111, in response to a most recent measurement of current utilization for one of the cores 115 exceeding a throttling threshold, may utilize a portion of the current measurement history for that core to determine whether or not to individually throttle that core. The control circuitry 111 may cause that core to throttle based on a result of a determination to individually throttle that core.

In such embodiments, the control circuitry 111 may orchestrate current utilization of the multicore processor 110 beyond an external voltage regulator overcurrent threshold 105 of an external voltage regulator circuitry 103 that powers the multicore processor 110. Duration of the current utilization beyond the external voltage regulator overcurrent threshold 105 may be less than a response time associated with a current sensor 104 and/or the external voltage regulator circuitry 103 (which may be one to two microseconds depending on characteristics of the external voltage regulator circuitry 103).

The current sensors 112, which again may be analog current comparators or other fast current sensors, may operate differently than the current sensor 104. In some embodiments, each current sensor 112 may be programmed with a throttling threshold and the measurements output by the current sensors 112 may be indications of whether or not measured current exceeds the throttling threshold. In some embodiments, each one of the current sensors 112 may measure current more than once for each current measurement by a current sensor 104 utilized by the external voltage regulator circuitry 103.

Figure 2:
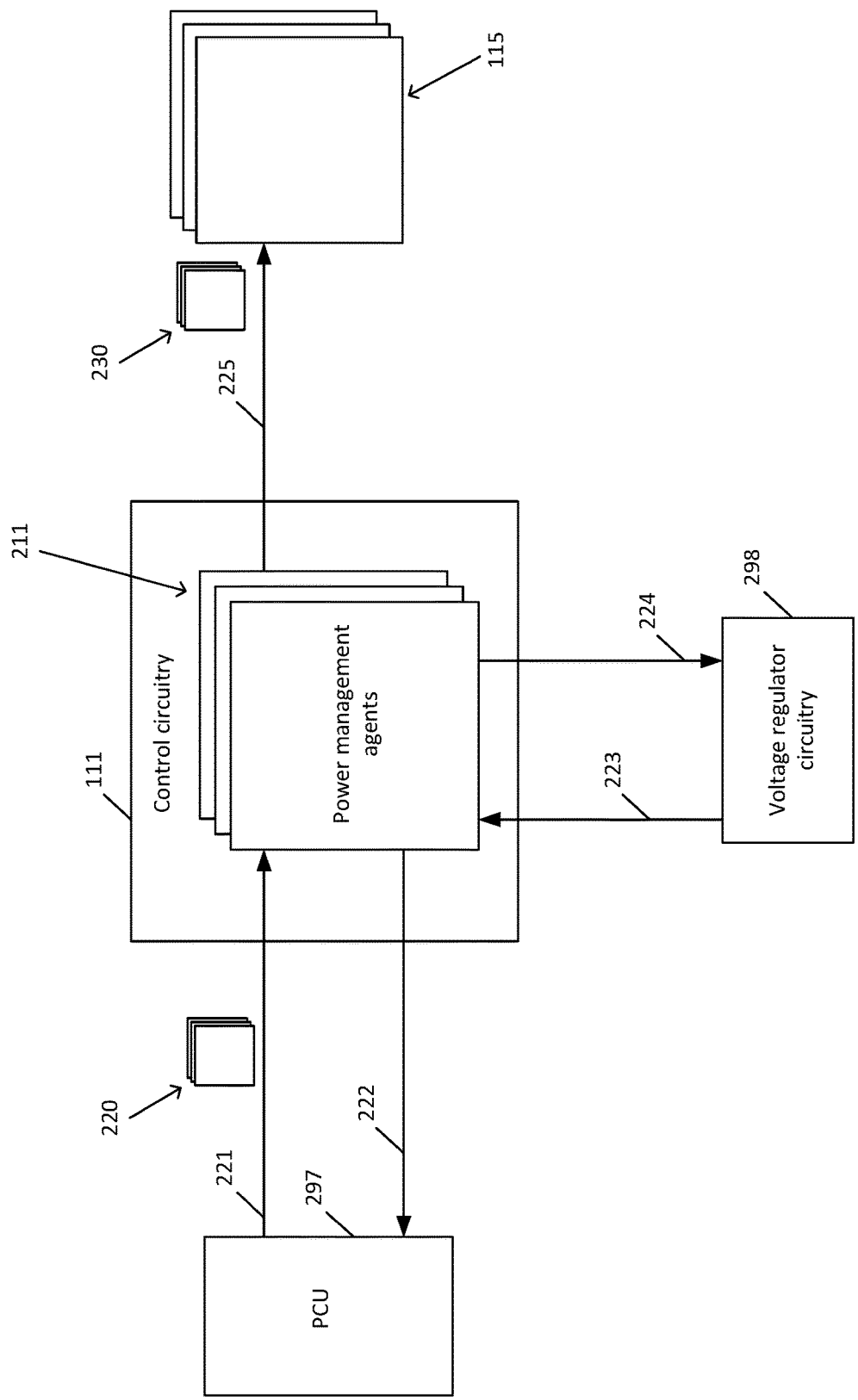
FIG. 2 illustrates an example of the control circuitry of FIG. 1 including power management agents, according to various embodiments.

FIG. 2 illustrates an example of the control circuitry 111 of FIG. 1 including power management agents 211, according to various embodiments. The uncore region may further include a PCU (power control unit) 297 to individually select operating characteristics, e.g., voltage, frequency, or the like, or combinations thereof, of the plurality of cores. The PCU 297 may send a signal 221 including a work point (WP) indicating operating characteristics including voltage and frequency for each core to the PMAs 211. Values of the operating characteristics may be set by allocating a power budget that is based on, e.g., based at least in part on, the external voltage regulator overcurrent threshold 105 (FIG. 1).

In some embodiments, the signal 221 may additionally include current parameters 220 for the cores, which may be used to set throttling thresholds of the current sensors 112. Values of the current parameters 220 may be set by allocating a power budget that is based on, e.g., based at least in part on, the external voltage regulator overcurrent threshold 105 (FIG. 1). In some embodiments, the current sensors 112 may be located in voltage regulator circuitry 298, such as a Fully Integrated Voltage Regulator (FIVR) for each core, and the PMAs 211 may transmit a command 224 to the voltage regulator circuitry 298, e.g., to a respective one of the FIVRs, to cause the current sensors 112 to be set and/or to control the cores 115 based on the operating characteristics (e.g., frequency and voltage).

The PMAs 211 may subsequently receive one or more signals 223 from a respective one of the FIVRs to indicate when a measured current crosses a corresponding one of the throttling thresholds (e.g., the indications may be sent when measured current exceeds the throttling threshold, and also when the measured current returns to within the throttling threshold).

In response to receiving a signal 223 indicating that a measured current exceeds a throttling threshold, the receiving one of the PMAs 211 may determine whether to throttle the corresponding one of the cores 115. In some embodiments, the determination may be based on a sliding window. The PMAs 211 may send a signal 225, such as a throttle request, to the corresponding core based on the determination. In some embodiments, the PMAs 211 may determine a degree of throttling (e.g., 10% throttle of the operating frequency) and/or a throttling period (e.g., 100 microseconds), and include parameter information 230 indicating the determined degree and/or period in the throttle request 225 if different than defaults. The throttling period may be indicated as a percentage of a base value (e.g., 10% of a 1 millisecond base period, to indicate 100 microseconds).

The PMAs 211 may determine whether to send a throttle release request (not shown) at a later time responsive to receiving a new signal (not shown) from the voltage regulator circuitry 298. In some examples, a throttle release request may release a throttle prior to the end of the determined throttling period. The PMAs 211 may determine whether to send the throttle release requests responsive to the new signal from the voltage regulator circuitry 298, and the determination may be based on a history of current measurement for the respective one of the cores 115. The PMAs 211 may utilize a sliding window to identify a portion of a history of current measurements to be utilized for this determination.

In some embodiments, each ones of the PMAs 211 may at times, e.g., at an interval, determine whether throttling is more frequent than a frequency threshold, and may send a signal 222, such as a license request, to the PCU 297 based on the determination. For instance, if more than 2.5% of the time a core is throttled (or some other predefined percentage), the PMAs 211 may generate a signal including a hint that too much throttling has been performed. The PCU 297 may utilize the hint to determine whether or not to send an update to the operating characteristics of the cores 115, such as a new lower operating frequency given too much throttling.

The hint may also suggest that a portion of a power allocation allocated to a particular core may be reallocated to another component, such as another one of the cores, and/or that a frequency for the core may be increased. In some embodiments, the current sensors 112 may include an additional current sensor per core to determine whether a threshold is breached or not for statistical information for such hints. The additional group of current sensors 112 may individually sense current utilization by each core simultaneously with individually sensing by the other ones of the sensors 112. The additional group of current sensors 112 may use a different threshold, e.g., a lower threshold, than the other sensor for the same core. This different threshold may be referred to herein as a "pseudo throttling" threshold, or alternatively a hysteresis threshold. In one example, the pseudo throttling threshold may be 5 A and the throttling threshold may be 10 A. The PMAs may track a count of breaches of the pseudo throttling threshold, and if breaches are less than a predetermined percentage of the time, may generate the signal 222 with the hint to increase frequency or change allocation.

Changing allocation may involve lowering the throttling threshold for this core if a portion of the power budget allocated to this core is reduced. In some implementations the throttling threshold may be lowered to the pseudo throttling threshold. Also, a throttling threshold for another core may be increased if a portion of the power budget allocated to the other core is increased in a reallocation.

Figure 3:
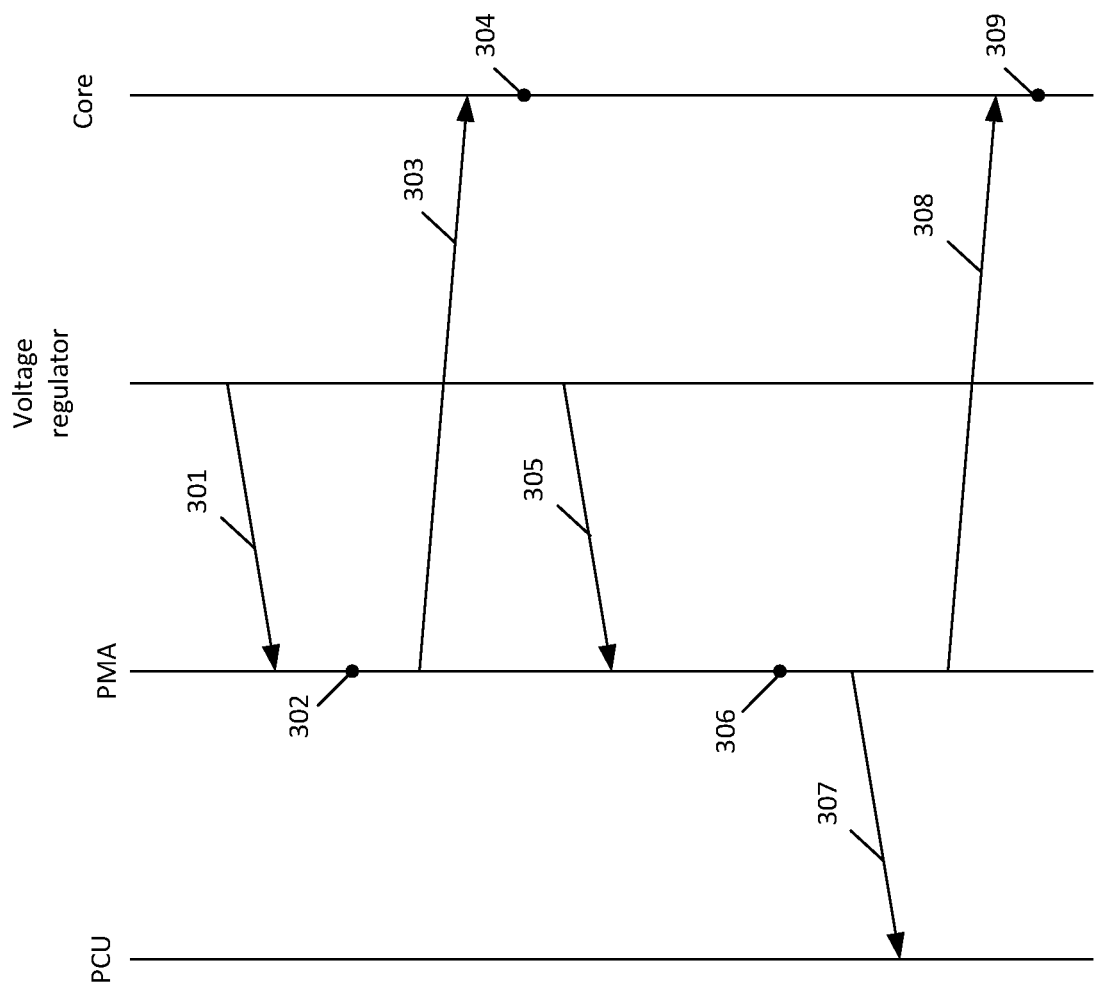
FIG. 3 is a signaling diagram to illustrate example operations that may be performed by the power management agents of FIG. 2, according to various embodiments.

FIG. 3 is a signaling diagram to illustrate example operations that may be performed by the power management agents 211 of FIG. 2, according to various embodiments. The voltage regulator circuitry 298 may output an event signal 301 to the PMAs 211 in response to a current crossing a throttling threshold, e.g., an output of a current comparator indicates that a throttling threshold is breached or that current returned to within the throttling threshold.

The PMAs 211 may determine 302 whether a throttling update is required, for example whether to send a throttle request or a throttle release request to a corresponding one of the cores 112. A case involving a throttle request 303 is illustrated. The core throttles 304 in response to the throttle request 303.

Later, when the current returns to within the throttling threshold, the voltage regulator circuitry 298 may output an event signal 305 to the PMAs 211 in response to an output of a current comparator indicating current returning to within the throttling threshold. The PMAs 211 may determine 306 whether the throttling is too frequent in a sliding window. For instance, if throttling is too frequent, the PMA may output a notification 307, such as a license request, to the PCU 297 with a hint to enable the PCU 297 to determine whether to lower the frequency to the core and/or change an allocation of a power budget (e.g., to increase the throttling threshold) for one or more of the current sensors 112.

In response to an end of a throttling period, the PMAs 211 may send a throttle release request 308 to the corresponding one of the cores 112. That core may release 309 the throttle.

Figure 4:
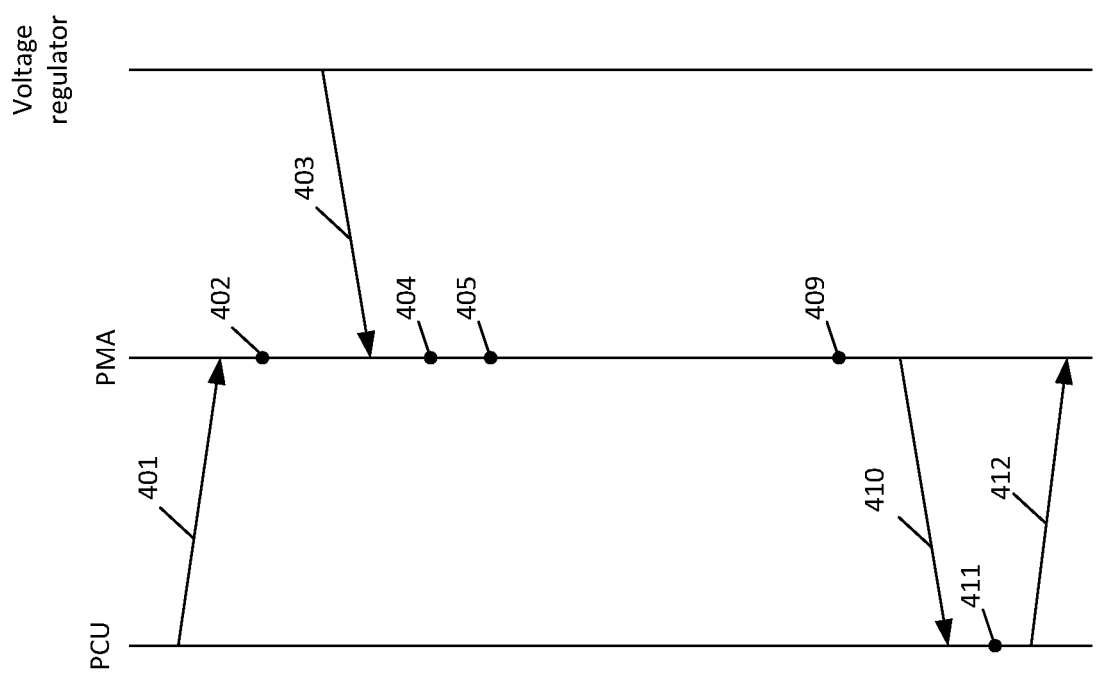
FIG. 4 is a signaling diagram to illustrate example operations associated with a hysteresis process that may be performed by the power management agents of FIG. 2, according to various embodiments.

FIG. 4 is a signaling diagram to illustrate example operations associated with a hysteresis process that may be performed by the power management agents of FIG. 2, according to various embodiments. The PCU 297 may instruct one of the PMAs 211 to restart 401 a hysteresis process, which may use more than one counter (not shown) of the control circuitry 111. The PMA may reset and start 402 a first counter of the counters (the first counter may be referred to herein as a "hysteresis counter"). Referring to FIG. 5, as shown in the third line of the pseudo code 499, the hysteresis counter may be incremented by a predetermined value, e.g., one, for each cycle the core is active if the hysteresis counter is below a saturation window. In some embodiments, the hysteresis counter may be 18 bits. The 9 highest bits may allow a granularity of approximately 5 microseconds up to 2 milliseconds.

Referring again to FIG. 4, the voltage regulator circuitry 298 may signal 403 that a pseudo throttling threshold associated with an additional analog current comparator is exceeded. The PMA may update 404, e.g., decrement, a second different counter of the counters (the second counter may be referred to herein as a "violation counter" or "penalty counter") based on the signal 403. Referring again to FIG. 5, as shown in the fourth line of the pseudo code 499, the penalty counter may be updated, e.g., decremented, by a penalty value if a new throttling period starts. The violation counter may be 15 bits, and a granular penalty may be 320 nSec.

Referring again to FIG. 4, the PMA may ignore 405 additional events based on the pseudo throttling threshold for a throttling duration period. If the violation counter is reduced to zero, the PMA may restart 409 the hysteresis counter. In response to the hysteresis counter reaching zero (based on the restart), the PMA may signal 410 a license request to the PCU 297 with a hint to enable the PCU 297 to determine whether to increase the frequency to the core and/or change an allocation of a power budget to decrease the throttling threshold or the pseudo throttling threshold for the current sensor. An additional counter of the counters may be referred to as a "telemetry counter". The PMA may increment the telemetry counter by one for every cycle in which throttling is applied. The PMA may report to a count of the telemetry counter on each license request to the PCU 297. In one example, the telemetry counter is greater bits than the first and second counters, e.g., 28 bits.

In some embodiments, the PCU may determine 411 frequency and/or voltage for each one of the cores 115 based on a power budget for the multicore processor. The PCU may signal 412 to restart hysteresis process (similar to restart 401) based on an update to frequency and/or voltage for one of the cores 115.

Figure 6:
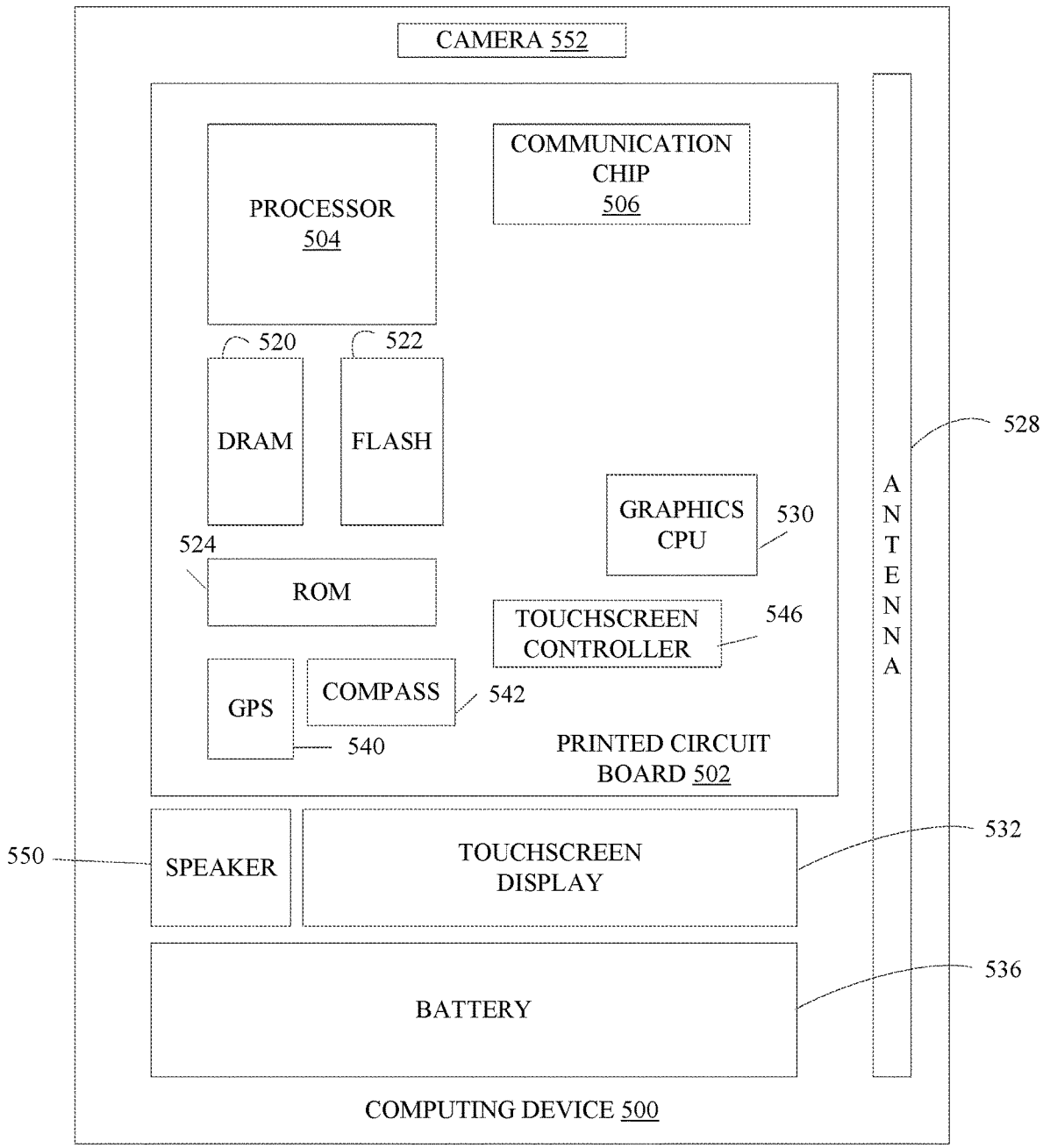
FIG. 6 illustrates an example computing device that may employ the apparatuses and/or methods described herein, according to various embodiments.

FIG. 6 illustrates an example computing device that may employ the apparatuses and/or methods described herein, according to various embodiments.

Example computing device 500 may employ the apparatuses and/or methods described herein, in accordance with various embodiments. As shown, computing device 500 may include a number of components, such as one or more processor(s) 504 (one shown) and at least one communication chip 506.

In various embodiments, the one or more processor(s) 504 each may include one or more processor cores, and power control technology earlier described with references to FIGS. 1-6. In various embodiments, the at least one communication chip 506 may be physically and electrically coupled to the one or more processor(s) 504. In further implementations, the communication chip 506 may be part of the one or more processor(s) 504. In various embodiments, computing device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computing device 500 may include other components that may or may not be physically and electrically coupled to the PCB 502. These other components include, but are not limited to, a memory controller (not shown), volatile memory (e.g., dynamic random access memory (DRAM) 520), non-volatile memory such as read only memory (ROM) 524, flash memory 522, an I/O controller (not shown), a digital signal processor (not shown), a crypto processor (not shown), a graphics processor 530, one or more antenna 528, a display (not shown), a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or a storage device (not shown) may include associated firmware (not shown) storing programming instructions configured to enable computing device 500, in response to execution of the programming instructions by one or more processor(s) 504, to practice all or selected aspects of the methods described herein. For example, the programming instructions may implement the earlier described control circuitry and/or PMA with references to the respective ones of FIGS. 1-5. In various embodiments, these aspects may additionally or alternatively be implemented using hardware separate from the one or more processor(s) 504, flash memory 512, or storage device 511.

The communication chips 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 5G, 5G, and beyond. The computing device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computing device 500 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 500 may be any other electronic device that processes data.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

EXAMPLES

Example 1 is an apparatus for current control of a multicore processor. The apparatus includes a plurality of cores; and a plurality of analog current comparators, each analog current comparator to measure current utilization by a corresponding one of the cores; and control circuitry coupled to the plurality of analog comparators, the control circuitry to cause the cores to individually throttle based on measurements from the corresponding analog current comparators.

Example 2 includes the subject matter of example 1, and the control circuitry is to store instructions executable to operate a plurality of power management agents to send throttle requests to the cores, respectively.

Example 3 includes the subject matter of any of examples 1-2, and the plurality of power management agents are to receive signals from voltage regulator circuitry coupled to the plurality of cores, and wherein the signals are based on outputs of the analog current comparators.

Example 4 includes the subject matter of any of examples 1-3, and the power management agents are to send throttle release requests to the cores, respectively, based on the measurements from the plurality of analog current comparators.

Example 5 includes the subject matter of any of examples 1-4, and the power management agents are to determine whether to send throttle release requests based on a plurality of histories of the current measurements of the cores, respectively.

Example 6 includes the subject matter of any of examples 1-5, and the power management agents are to utilize sliding windows to identify the plurality of histories of the current measurements of the cores.

Example 7 includes the subject matter of any of examples 1-6, and the multicore processor further includes control circuitry includes a power control unit (PCU) to individually set voltages of the plurality of cores.

Example 8 includes the subject matter of any of examples 1-7, and voltage regulator circuitry coupled to the plurality of cores, the voltage regulator circuitry to provide the individually set voltages to the plurality of cores in response to a command from the PCU.

Example 9 includes the subject matter of any of examples 1-8, and the voltages of the plurality of cores are set based on an external voltage regulator overcurrent threshold.

Example 10 includes the subject matter of any of examples 1-9, and the control circuitry is to orchestrate current utilization of the multicore processor beyond the external voltage regulator overcurrent threshold for a period of time that is less than a response time associated with an external current sensor of external voltage regulator circuitry.

Example 11 includes the subject matter of any of examples 1-10, and the control circuitry is to store instructions executable to operate the plurality of power management agents to send the throttle requests to the cores, respectively.

Example 12 is a computer-readable medium having instructions of a per-core power management agent for a multicore processor stored thereon that, in response to execution by a processing device, cause the processing device to perform operations, to: generate a current measurement history for each core of the multicore processor based on measurements of current utilization of a respective one of the cores; in response to receipt of a notification that a most recent measurement of current for one of the cores exceeds a threshold, utilize a portion of the current measurement history for the one core to determine whether or not to individually throttle the one core; and cause the one core to throttle based on a result of a determination to individually throttle the one core.

Example 13 includes the subject matter of example 12, and the current measurement histories are based on a plurality of counters for the cores, respectively.

Example 14 includes the subject matter of any of examples 12-13, and the operations are further to: perform at least one of increment a count or decrement the count for each core every cycle when the respective core is active; and perform the other of increment the same or another count or decrement the same or another count for each core for each application of a throttling period to the cores, respectively.

Example 15 includes the subject matter of any of examples 12-14, and the operations are further to: perform at least one of increment a count or decrement the count by a first number of bits for each core every active period when the respective core is active; and perform the other of increment the same or another count or decrement the same or another count by a second number of bits that is different than the first number of bits for each core for each application of a throttling period to the cores, respectively.

Example 16 includes the subject matter of any of examples 12-15, and the operations are further to transmit a report to a power control unit (PCU) of the multicore processor in response to the determination to individually throttle said core, the report usable for changing a portion of an allocation of a power budget to said core or changing a frequency of the core or another core.

Example 17 is a method to control current (Icc) for a multicore processor, the method comprising: individually sensing current utilization by each core of a plurality of cores of the multicore processor using a first plurality of current sensors, respectively; and in response to sensing, for one of the cores, current utilization greater than a threshold, determining whether to throttle the one core.

Example 18 includes the subject matter of example 17, and individually sensing current utilization by each core of the plurality of cores of the multicore processor using a respective one of a second plurality of current sensors simultaneously with individually sensing using the first plurality of current sensors.

Example 19 includes the subject matter of any of examples 17-18, and the determining whether to throttle is based on a result of the individual sensing using the first plurality of current sensors and the individual sensing using the second plurality of current sensors.

Example 20 includes the subject matter of any of examples 17-19, and the multicore processor consuming a total current that is greater than an external voltage regulator overcurrent threshold for a time period responsive to a determination to not throttle the one core.

Example 21 includes the subject matter of any of examples 17-20, and a response time of the current sensors in less than a response time of a current sensor of external voltage regulator circuitry.

Example 22 is an apparatus to control current (Icc) for a multicore processor, the apparatus comprising: means for generating a current measurement history for each core of the multicore processors based on measurements of current for the cores, respectively; means for utilizing a portion of the current measurement history for one of the cores to determine whether or not to individually throttle said core in response to receipt of a notification that a most recent measurement of current for said core exceeds a threshold; and means for throttling said core responsive to utilization of the portion of the current measurement history.

Example 23 includes the subject matter of example 22, and the current measurement history for each core is based on a respective counter of a plurality of counters corresponding to the cores.

Example 24 includes the subject matter of any of examples 22-23, and means for performing at least one of increment a count or decrement the count for each core every cycle when the respective core is active; and means for performing the other of increment the same or another count or decrement the same or another count for each core in association with application of throttles to the cores, respectively.

Example 25 includes the subject matter of any of examples 22-24, and means for performing at least one of increment a count or decrement the count by a first number of bits for every active period when the respective core is active; and means for performing the other of increment the count or another count or decrement the count or another count by a second number of bits that is different than the first number of bits for each core in association with of a throttling period to the cores, respectively.

Example 26 includes the subject matter of any of examples 22-25, and means for transmitting a report to a power control unit (PCU) of the multicore processor in response to the determination to individually throttle said core, the report usable for changing a portion of an allocation of a power budget to said core or changing a frequency of said core or another core.

Example 27 is an apparatus to control current (Icc) for a multicore processor, the apparatus comprising: means for individually sensing current utilization by each core of a plurality of cores of the multicore processor using a first plurality of current sensors, respectively; and means for determining whether to throttle one of the cores in response to sensing, for the one core, current utilization greater than a threshold.

Example 28 includes the subject matter of example 27, and means for individually sensing current utilization by each core of the plurality of cores of the multicore processor using a respective one of a second plurality of current sensors simultaneously with individually sensing using the first plurality of current sensors.

Example 29 includes the subject matter of any of examples 27-28, and the multicore processor is to consume a total current that is greater than an external voltage regulator overcurrent threshold for a time period responsive to a determination to not throttle the one core.

Example 30 includes the subject matter of any of examples 27-29, and a response time of the current sensors in less than a response time of a current sensor of external voltage regulator circuitry.

Example 31 is a system comprising: a voltage regulator to enter an overcurrent state based on a voltage regulator overcurrent threshold; and a multicore processor to receive power from the voltage regulator. The multicore processor includes: a plurality of cores; a plurality of analog current comparators, each analog current comparator to measure current utilization by a corresponding one of the cores; and control circuitry coupled to the plurality of analog comparators, the control circuitry to cause the cores to individually throttle based on measurements from the corresponding analog current comparators.

Example 32 includes the subject matter of example 31, and the control circuitry is to orchestrate current utilization of the multicore processor beyond the external voltage regulator overcurrent threshold for a period of time that is less than a response time associated with the voltage regulator.

Example 33 includes the subject matter of any of examples 31-32, and the multicore processor further includes voltage regulator circuitry coupled to the plurality of cores, the voltage regulator circuitry to provide the individually set voltages to the plurality of cores.

Example 34 includes the subject matter of any of examples 31-33, and a power source to provide the power to the voltage regulator.

What is claimed is:

1. An apparatus, comprising:
   a multicore processor including:
      a plurality of cores;
      a plurality of analog current comparators, each analog current comparator to indicate whether a measured current utilization of one of the plurality of cores exceeds a threshold based on one or more measurements of current utilization by the one of the plurality of cores; and
      control circuitry coupled to the plurality of analog current comparators, the control circuitry to send one or more throttle requests to one or more cores of the plurality of cores to cause the one or more cores to individually throttle based on respective indications from the corresponding analog current comparators.

2. The apparatus of claim 1, wherein a plurality of power management agents are to receive signals from voltage regulator circuitry coupled to the plurality of cores, and wherein the signals are based on outputs of the analog current comparators.

3. The apparatus of claim 1, wherein a plurality power management agents are to send throttle release requests to the cores, respectively, based on the measurements from the plurality of analog current comparators.

4. The apparatus of claim 3, wherein the pluarlity of power management agents are to determine whether to send throttle release requests based on a plurality of histories of the current measurements of the cores, respectively.

5. The apparatus of claim 4, wherein the plurality of power management agents are to utilize sliding windows to identify the plurality of histories of the current measurements of the cores.

6. The apparatus of claim 1, wherein the control circuitry includes a power control unit (PCU) to individually set voltages of the plurality of cores.

7. The apparatus of claim 6, wherein the multicore processor further includes voltage regulator circuitry coupled to the plurality of cores, the voltage regulator circuitry to provide the individually set voltages to the plurality of cores in response to a command from the PCU.

8. The apparatus of claim 7, wherein the voltages of the plurality of cores are set based on an external voltage regulator overcurrent threshold.

9. The apparatus of claim 8, wherein the control circuitry is to orchestrate current utilization of the multicore processor beyond the external voltage regulator overcurrent threshold for a period of time that is less than a response time associated with an external current sensor of external voltage regulator circuitry.

10. The apparatus of claim 1, wherein the control circuitry is to store instructions executable to operate a plurality of power management agents to send the throttle requests to the cores, respectively.

11. A non-transitory computer-readable medium having instructions of a per-core power management agent for a multicore processor stored thereon that, in response to execution by a processing device, cause the processing device to perform operations, to:
   generate a current measurement history for each core of the multicore processor based on measurements of current utilization of a respective one of the cores;
   in response to receipt of a notification that a most recent measurement of current for one of the cores exceeds a threshold, utilize a portion of the current measurement history for the one core to determine whether or not to individually throttle the one core, the current measurement history to indicate an active period of the one core; and
   cause the one core to throttle based on a request from a result of a determination to individually throttle the one core.

12. The non-transitory computer-readable medium of claim 11, wherein the current measurement histories are based on a plurality of counters for the cores, respectively.

13. The non-transitory computer-readable medium of claim 11, wherein the operations are further to:
   perform at least one of increment a count or decrement the count for each core every cycle when the respective core is active; and perform the other of increment the same or another count or decrement the same or another count for each core for each application of a throttling period to the cores, respectively.

14. The non-transitory computer-readable medium of claim 11, wherein the operations are further to:
perform at least one of increment a count or decrement the count by a first number of bits for each core every active period when the respective core is active; and
perform the other of increment the same or another count or decrement the same or another count by a second number of bits that is different than the first number of bits for each core for each application of a throttling period to the cores, respectively.

15. The non-transitory computer-readable medium of claim 11, wherein the operations are further to transmit a report to a power control unit (PCU) of the multicore processor in response to the determination to individually throttle said core, the report usable for changing a portion of an allocation of a power budget to said core or changing a frequency of the core or another core.

16. A method to control current (Icc) for a multicore processor, the method comprising:
individually sensing current utilization by each core of a plurality of cores of the multicore processor using a first plurality of current sensors, respectively;
in response to sensing, for the each core, determining whether to throttle the each core, based on a comparison between the sensed current utilization of the each core and a threshold that corresponds to the each core, wherein the threshold is one of a plurality of thresholds that respectively correspond to the plurality of cores; and
sending a throttling request to each of the cores that were determined to be throttled.

17. The method of claim 16, further comprising:
individually sensing current utilization by each core of the plurality of cores of the multicore processor using a respective one of a second plurality of current sensors simultaneously with individually sensing using the first plurality of current sensors.

18. The method of claim 17, wherein the determining whether to throttle is based on a result of the individual sensing using the first plurality of current sensors and the individual sensing using the second plurality of current sensors.

19. The method of claim 16, further comprising the multicore processor consuming a total current that is greater than an external voltage regulator overcurrent threshold for a time period responsive to a determination to not throttle the one core.

20. The method of claim 16, wherein a response time of the current sensors is less than a response time of a current sensor of external voltage regulator circuitry.

21. A system, comprising:
a voltage regulator to enter an overcurrent state based on a voltage regulator overcurrent threshold;
a multicore processor to receive power from the voltage regulator, the multicore processor including:
a plurality of cores;
a plurality of analog current comparators, each analog current comparator to indicate whether a measured current utilization of one of the plurality of cores exceeds a threshold based on one or more measurements of current utilization by the one of the plurality of cores; and
control circuitry coupled to the plurality of analog current comparators, the control circuitry to send one or more throttle requests to one or more cores of the plurality of cores to cause the one or more cores to individually throttle based on respective indications from the corresponding analog current comparators.

22. The system of claim 21, wherein the control circuitry is to orchestrate current utilization of the multicore processor beyond an external voltage regulator overcurrent threshold for a period of time that is less than a response time associated with the voltage regulator.

23. The system of claim 21, wherein the multicore processor further includes voltage regulator circuitry coupled to the plurality of cores, the voltage regulator circuitry to provide individually set voltages to the plurality of cores.

24. The system of claim 21, further comprising a power source to provide the power to the voltage regulator.

* * * * *